(12) United States Patent
Song

(10) Patent No.: US 9,145,848 B2
(45) Date of Patent: Sep. 29, 2015

(54) PRESSURE SUSTAINING SYSTEM FOR LPG BOMBE

(75) Inventor: Ju-Tae Song, Suwon-shi (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 624 days.

(21) Appl. No.: 13/449,033

(22) Filed: Apr. 17, 2012

(65) Prior Publication Data

US 2013/0126019 A1 May 23, 2013

(30) Foreign Application Priority Data

Nov. 17, 2011 (KR) ........................ 10-2011-0120506

(51) Int. Cl.
*F02M 21/02* (2006.01)
(52) U.S. Cl.
CPC ............. *F02M 21/0221* (2013.01); *Y02T 10/32* (2013.01); *Y10T 137/7837* (2015.04)
(58) Field of Classification Search
CPC ..................................................... F16K 21/04
USPC ......... 137/587, 511, 576; 62/48.7, 50.1, 50.4, 62/50.7, 53.2, 45.1, 47.1, 48.1
See application file for complete search history.

(56) References Cited

U.S. PATENT DOCUMENTS

| | | | |
|---|---|---|---|
| 2,400,037 A * | 5/1946 | Arndt et al. ..................... 62/47.1 |
| 2,502,525 A * | 4/1950 | Krugler ........................... 62/50.7 |
| 2,731,802 A * | 1/1956 | MacSporran ................... 62/48.1 |
| 2,787,127 A | 4/1957 | Benz |
| 3,123,981 A * | 3/1964 | Carney et al. .................. 62/48.1 |
| 3,298,187 A * | 1/1967 | Short .............................. 62/48.1 |
| 3,548,856 A * | 12/1970 | Vant ............................... 62/48.1 |
| 3,659,742 A * | 5/1972 | Tagawa ......................... 137/576 |
| 4,080,800 A * | 3/1978 | Spaulding et al. ............. 62/50.4 |
| 4,723,573 A | 2/1988 | Burnett |
| 5,542,398 A * | 8/1996 | Marcon ......................... 123/527 |
| 5,566,712 A * | 10/1996 | White et al. ................... 62/48.1 |
| 5,572,875 A * | 11/1996 | Gustafson ..................... 62/48.1 |
| 2008/0134693 A1 * | 6/2008 | Harper et al. .................. 62/50.7 |

FOREIGN PATENT DOCUMENTS

| | | | |
|---|---|---|---|
| KR | 20020020570 | * | 3/2002 |
| KR | 1020030042379 A | | 5/2003 |
| KR | 1020030088282 A | | 11/2003 |
| KR | 1020040031946 A | | 4/2004 |
| KR | 1020080062301 A | | 7/2008 |
| WO | WO 2009/010177 A1 | | 1/2009 |

* cited by examiner

*Primary Examiner* — Craig Schneider
*Assistant Examiner* — Joseph P Heil
(74) *Attorney, Agent, or Firm* — Morgan, Lewis & Bockius LLP

(57) ABSTRACT

A pressure sustaining system for an LPG bombe may include the LPG bombe, in which an LPG fuel may be injected and which may be equipped with a ventilation tunnel for emitting the air inside the LPG bombe, and a check valve unit, installed at an opening of the ventilation tunnel, with a fixed conversion pressure so as to keep an air pressure inside the LPG bombe above a predetermined value.

7 Claims, 4 Drawing Sheets

(a)

(b)

(a)

(b)

(a)

(b)

PRESSURE SUSTAINING SYSTEM FOR LPG BOMBE

CROSS-REFERENCE TO RELATED APPLICATION

The present application claims priority to Korean Patent Application No. 10-2011-0120506, filed on Nov. 17, 2011, the entire contents of which is incorporated herein for all purposes by this reference.

BACKGROUND OF THE INVENTION

1. Field of the Invention

The present invention relates to a pressure sustaining system for LPG bombe, and more particularly, to a pressure sustaining system for LPG bombe, which sustains the pressure of the LPG fuel even at a low temperature thereby improving a vehicle's cold start ability.

2. Description of Related Art

In general, LPG (Liquefied Petroleum Gas) fuel has a high octane number, excellent heat-resisting property and is inexpensive, so it is commonly used in a variety of commercial vehicles including a car. Such LPG fuel is a gaseous material which is liquefied at a room temperature by applying a fixed magnitude of pressure and is pumped into a bombe for use.

Ordinarily, a LPG bombe is formed using a steel plate with a fixed, minimum thickness, and it is formed in a cylindrical shape having a certain capacity. On one end, a charging valve is formed for charging the LPG fuel, and on the other end is formed a pressure indicator to indicate the volume of gas stored inside.

Charging of the LPG fuel is done through a charging valve, and once the charging is complete, the charging valve is closed so as to prevent overcharging. The LPG fuel stored in the LPG bombe by a fixed, minimum pressure is supplied to the combustion chamber in the quantity required by the engine.

In the case of a LPG bombe according to the prior art, the volumetric efficiency of the fuel tank is purely achieved by compression, and therefore, if the compression pressure drops and reaches the atmospheric pressure, the LPG fuel in the fuel tank can no longer be used and must be re-charged.

Especially, the start ability of an engine declines in the winter time. For example, in the summer time when the temperature is 20~30° C. (butane 100%), the pressure inside the fuel tank is approximately 3 bar, and the gauge pressure at the injector is 8 to 10 bar, but in the winter time when it is −25° C. to 0° C. (butane 100%), the pressure inside the fuel tank reaches 0 bar, while the gauge pressure at the injector is 5 bar, which means the fuel pressure goes down and the start ability of a an engine drops significantly.

Hence, a pressure sustaining system, which keeps the pressure inside a LPG bombe constant and above the atmospheric pressure so that the start ability does not drop in low temperatures such as in winter, is in demand.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a pressure sustaining system for LPG bombe, which keeps the pressure inside a LPG bombe above the atmospheric pressure so that, in case of a cold start and accelerating or decelerating, the drivability of a vehicle will be stabilized.

The technical problems that the present invention is set out to solve are not limited to the ones mentioned above, and those that are not mentioned shall be clearly understood by a person skilled in the art from looking at the specification of the present invention.

In an aspect of the present invention, a pressure sustaining system for an LPG bombe may include the LPG bombe, in which an LPG fuel is injected and which is equipped with a ventilation tunnel for emitting the air inside the LPG bombe, and a check valve unit, installed at an opening of the ventilation tunnel, with a fixed conversion pressure so as to keep an air pressure inside the LPG bombe above a predetermined value.

The pressure sustaining system for the LPG bombe may further include an air-ventilation valve slidably engaged to the ventilation tunnel, the air ventilation valve opening or closing the ventilation tunnel.

The air inside the LPG bombe is not completely removed after a watertight test when the LPG bombe is manufactured, and a predetermined amount of air remains in the LPG bombe.

The remaining air in the LPG bombe is between 10% and 20% of total volume in the LPG bombe.

The check value unit is installed to a portion of the LPG bombe where the remaining air exists.

The predetermined amount of conversion pressure is greater than the atmospheric pressure.

The check valve unit may include a ball valve, a rubber valve, or a metal valve.

The ventilation tunnel is formed as one-way.

According to a pressure sustaining system of the present invention, by having a small amount of air remain in the LPG bombe during the manufacturing process and by installing a check valve at the opening of the ventilation tunnel to keep the air pressure inside the LPG bombe above a predetermined value, the volume of air is compressed in the low temperatures so the pressure inside the bombe is kept stable even in the cold start situations when the LPG fuel's evaporability is diminished, which makes the emission of the LPG fuel go smoothly.

In other words, even in the low temperatures as in the winter, the problems of delay in starting an engine and hitches when accelerating or decelerating due to the LPG fuel liquefaction (butane 100%, propane 10 to 20%) can be solved.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
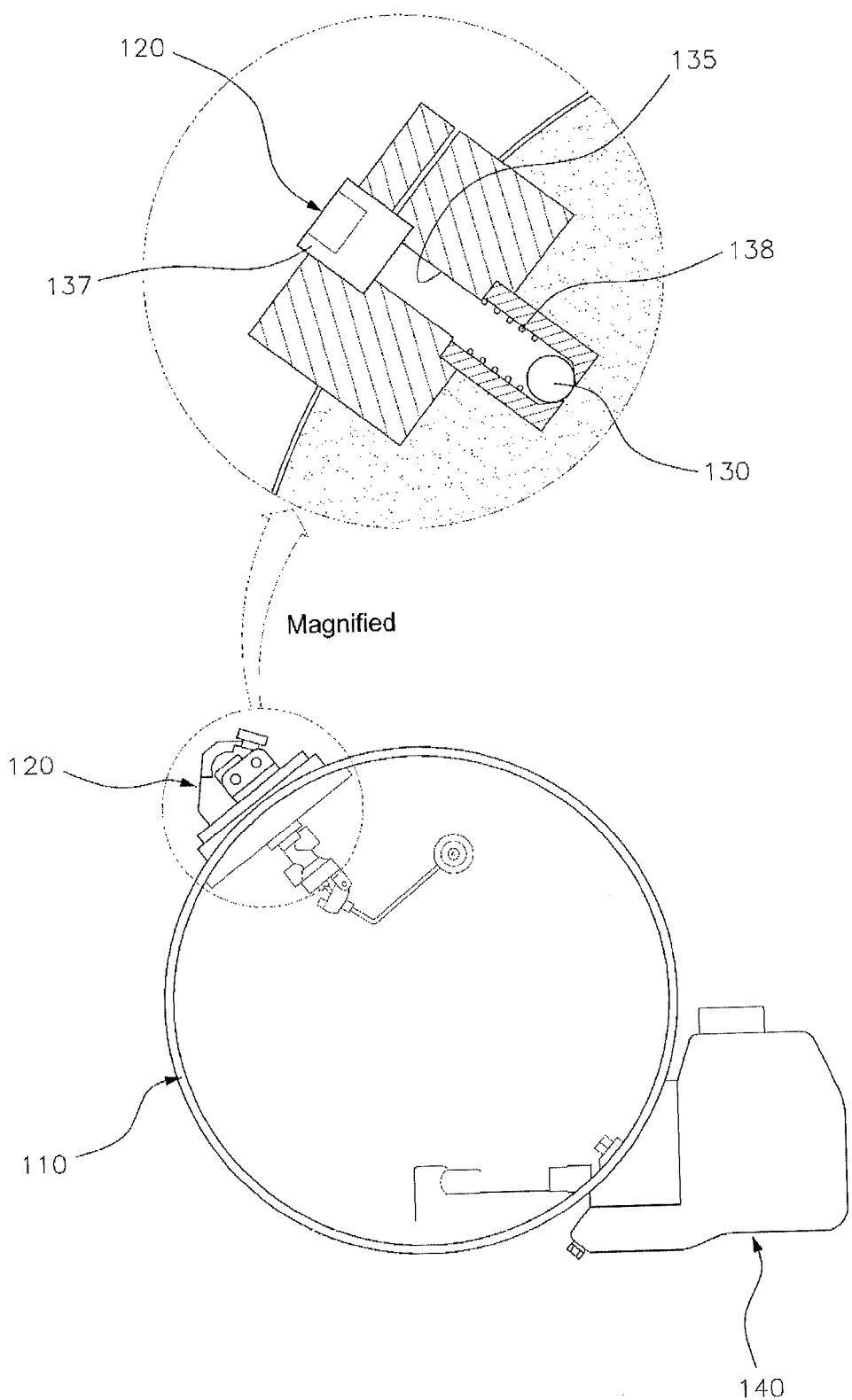
FIG. 1 is a schematic diagram of a pressure sustaining system for LPG bombe according to an example of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereafter, with reference to the attached drawings, the exemplary embodiment of the present invention will be described in detail. Before proceeding, it should be noted that the terminologies and words used on this specification and in the claims are not to be interpreted solely as the general or dictionary meanings, and they should be interpreted as the meanings and the concept which correspond with the technological ideas of the present invention based on the principle that the inventor can properly define the concept of the terminologies in order to explain his own invention in the best possible way. Therefore, the compositions described in the exemplary embodiments and the drawings of this specification are merely the most preferred types of embodiment and they do not represent the entire technological ideas of the present invention, and thus, it should be understood that there can be a variety of equivalents and alterations, which can replace these embodiments at the time of filing this application.

Generally, the drivability of a LPG vehicle is directly influenced by the evaporative nature of LPG and the outside temperature, and during the winter time when the internal evaporation pressure of a bombe is low, it is more influenced by the initial start ability.

Especially in the case of a butane fuel, of which the evaporability is low, the pressure inside a LPG bombe is close to the atmospheric pressure when the temperature is below −15° C. This lowers the emission rate of the fuel pump and causes poor start ability and shut-downs of the engine.

Hence, the present invention is designed to provide a pressure sustaining system for LPG bombe, which can stably maintain the pressure inside the bombe and emit the LPG fuel smoothly even under the cold start circumstances (−25° C. to −15° C.) such as in the winter when the evaporability of the LPG fuel is low.

FIG. 1 is a schematic diagram of a pressure sustaining system for LPG bombe according to an example of the present invention.

Currently, a manufacturing process of a LPG bombe includes followings: injecting a fixed amount of air (approximately 18.6 bar), conducting a watertight leakage test and opening the air-ventilation valve 137 to remove the pressure inside a LPG bombe.

By adding an one-way check valve 130 with a small amount of conversion pressure in the front part of the air ventilation valve 137 of the LPG bombe and by having a part of the air, which was injected during the watertight test, remain in the LPG bombe during the manufacturing process, the present invention is designed to maintain the minimum bombe pressure necessary for a start-up even at the time of a low evaporability using the effect of rising pressure as the remaining air's volume decreases when it is being charged with the LPG fuel.

A pressure sustaining system for LPG bombe according to an exemplary embodiment of the present invention includes a LPG bombe 110, in which the LPG fuel is injected and which is equipped with a ventilation tunnel 135 for emitting the air inside, an air-ventilation valve 137, which opens and closes the ventilation tunnel 135, and a check valve 130 with a fixed conversion pressure so as to keep the air pressure inside the LPG bombe above a predetermined value, and which is installed at the opening of the ventilation tunnel 135.

The LPG bombe 110 can be formed of an iron plate having a certain thickness and the LPG fuel is supplied to it through a charging member 140. However, the air inside the LPG bombe 110 may not be completely removed and there may be a small amount of air remaining inside the bombe after the watertight test. The volume of the remaining air should be decided as being somewhere between 10% and 20% of the total volume the LPG bombe is capable of holding.

In other words, the present invention keeps the pressure inside the bombe above the conversion pressure of the check valve in comparison with the atmospheric pressure so as to maintain the minimum bombe pressure necessary for start-up. Also, the remaining air mentioned above is lighter compared to the LPG fuel, and therefore, it floats in the very top portion inside the LPG bombe 110, and since the change in pressure as the temperature changes is minimal, it is able to keep the minimum pressure necessary to start an engine.

The check valve unit 120 can be formed in the ventilation tunnel 135 and can be selected from the following: a ball valve, a rubber valve or a metal valve. In addition, the check valve unit 120 can be equipped with a spring 138 so as to give it elasticity and dynamic stability when it is being opened and closed.

The check valve unit 120 has a fixed amount of conversion pressure so as to keep the air pressure inside above a predetermined value, and the conversion pressure must be set above the atmospheric pressure. Hence, a manometer measuring the atmospheric pressure outside and a thermometer measuring the temperature outside can be arranged.

Figure 2:
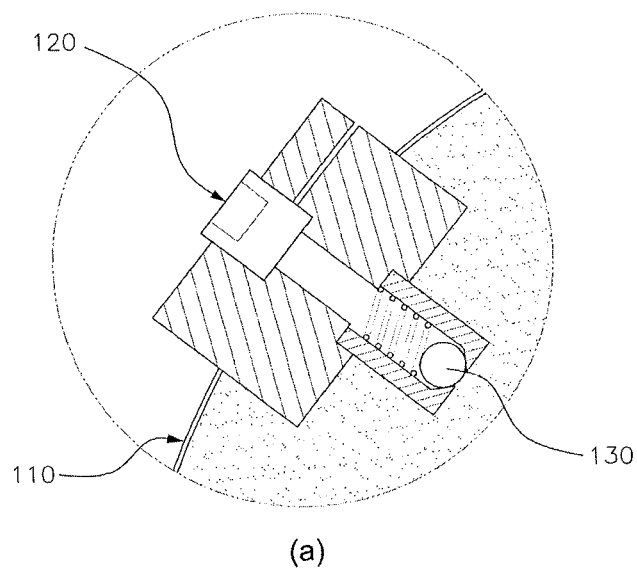
FIG. 2 is an exemplary embodiment of the ventilation tunnel opening as the pressure inside the LPG bombe changes according to an example of the present invention.
Figure 2:
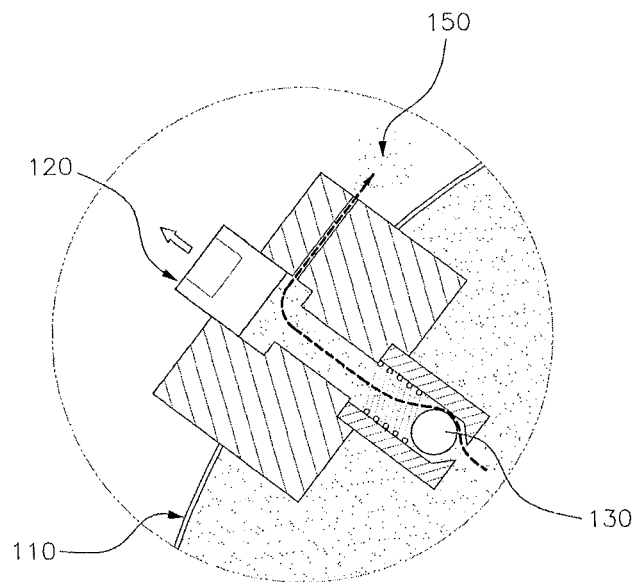

FIG. 2 is an exemplary embodiment of the ventilation tunnel opening as the pressure inside the LPG bombe changes according to an example of the present invention.

According to an exemplary embodiment of the present invention, when having a small amount of air remain inside the LPG bombe 110, if the air pressure inside the bombe is smaller than the atmospheric pressure outside, measured by the manometer, the check valve 130 is closed as in the FIG. 2(a) and the air inside the bombe will not leak.

On the other hand, if the air pressure inside the LPG bombe 110 is greater than the atmospheric pressure outside, measured by the manometer, the check valve 130 is opened as in the FIG. 2(b) and the air 150 inside the bombe will be emitted.

As explained above, in an exemplary embodiment of the present invention, whether the check valve 130 should be opened or closed is decided by comparing the air pressure inside the bombe with the atmospheric pressure outside the bombe. Therefore, it properly controls the evaporation pressure of the LPG fuel inside the bombe and provides the fuel tank with the LPG fuel accordingly. Hence, it is able to prevent the problems of delay in starting an engine or of the engine not starting at all.

Figure 3:
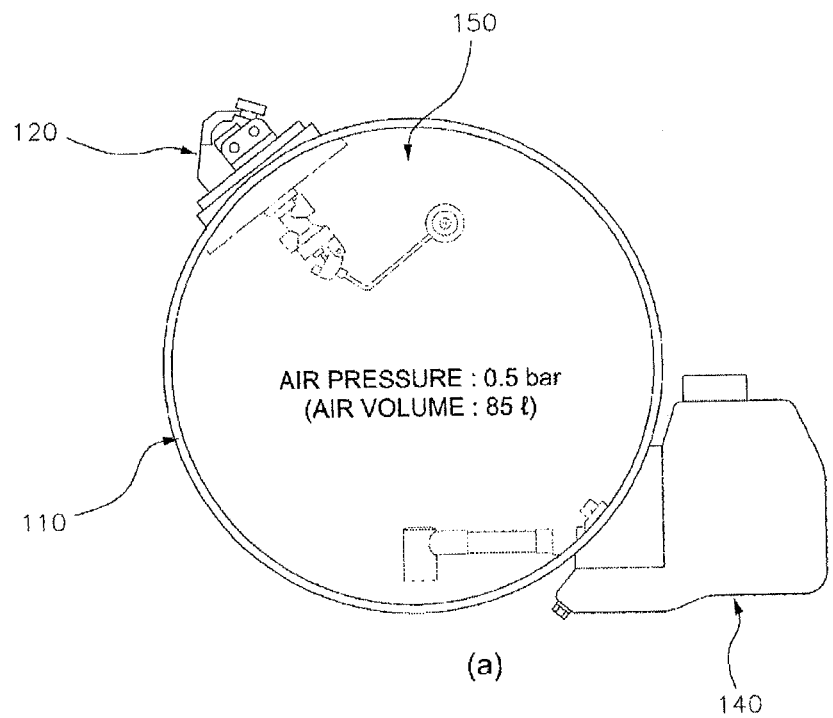
FIG. 3 is an exemplary embodiment of the change in pressure inside the LPG bombe by the charging of LPG according to an example of the present invention.
Figure 3:
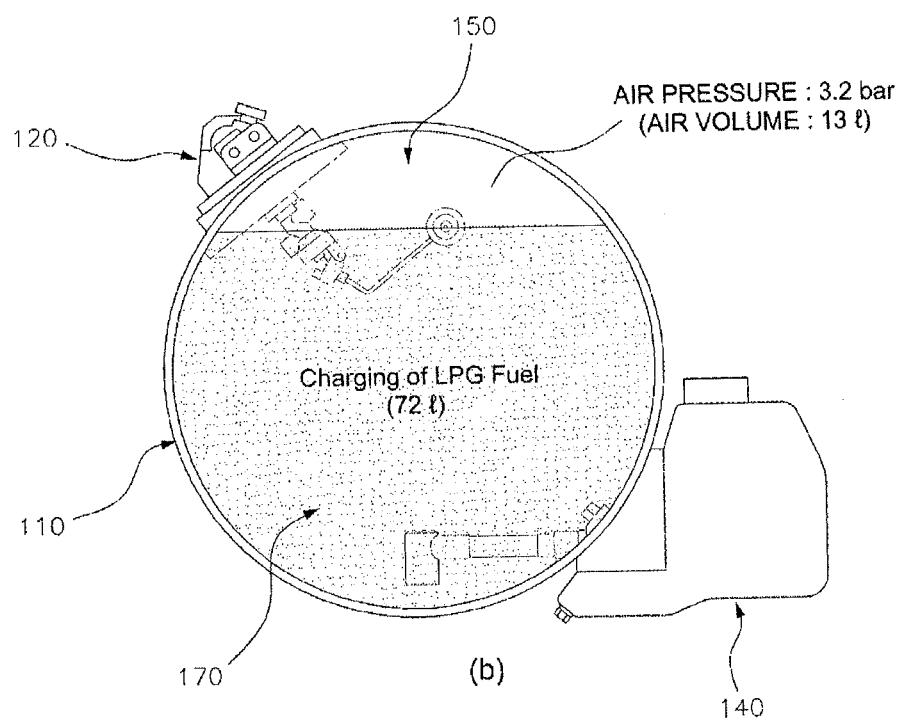

FIG. 3 is an exemplary embodiment of the change in pressure inside the LPG bombe by the charging of LPG according to an example of the present invention.

In general, when injecting the LPG fuel 170, it is recommended to inject approximately 85% of the maximum capacity of the bombe since there is the danger of an explosion coming from the expansion of the LPG.

According to an exemplary embodiment of the present invention, for example, if the conversion pressure of the check valve 130 is set as 0.5 bar, 0.5 bar of air will remain in the LPG bombe when the product leaves the factory, and this will go up as the remaining air's volume decreases as the LPG fuel is charged to the bombe.

At this time, by how much the magnitude of the pressure goes up can be calculated by the following mathematical expression 1.

$$P_1 V_1 = P_2 V_2 \qquad \text{MATHEMATICAL EXPRESSION 1}$$

Suppose the initial pressure ($P_1$) is 0.5 bar, the volume ($V_1$) of the LPG bombe is 85 liters (l), and the residual volume of the bombe after it has been fully charged is 13 liters (l), the magnitude of the pressure that went up (p2) can be calculated by using the mathematical expression above, (0.5 bar×85 l)/13 l=3.27 bar.

TABLE 1

| Conditions | FULL (85%) | TDP TESTING CONDITION (40%) | WARNING LIGHT ON (15%) | EMPTY (0%) |
|---|---|---|---|---|
| FUEL VOLUME (l) | 72 | 34 | 13 | 0 |
| AIR VOLUME (l) | 13 | 51 | 72 | 85 |
| AIR PRESSURE (bar) | 3.27 | 0.83 | 0.61 | 0.5 |

In reference to TABLE 1, using the mathematical expression 1 above, if the bombe is charged in full (85%) with the LPG fuel, the air pressure inside the bombe will increase by approximately 3.3 bar, and when the residual fuel is 40%, as in the TDP testing condition, 0.83 bar of air pressure should remain in theory.

In other words, even under a severe testing condition of 100% butane fuel and cold start up, the air pressure in the magnitude of approximately 1 bar remains inside the bombe, and therefore, it can prevent the diminishing of the evaporability of the LPG fuel.

Figure 4:
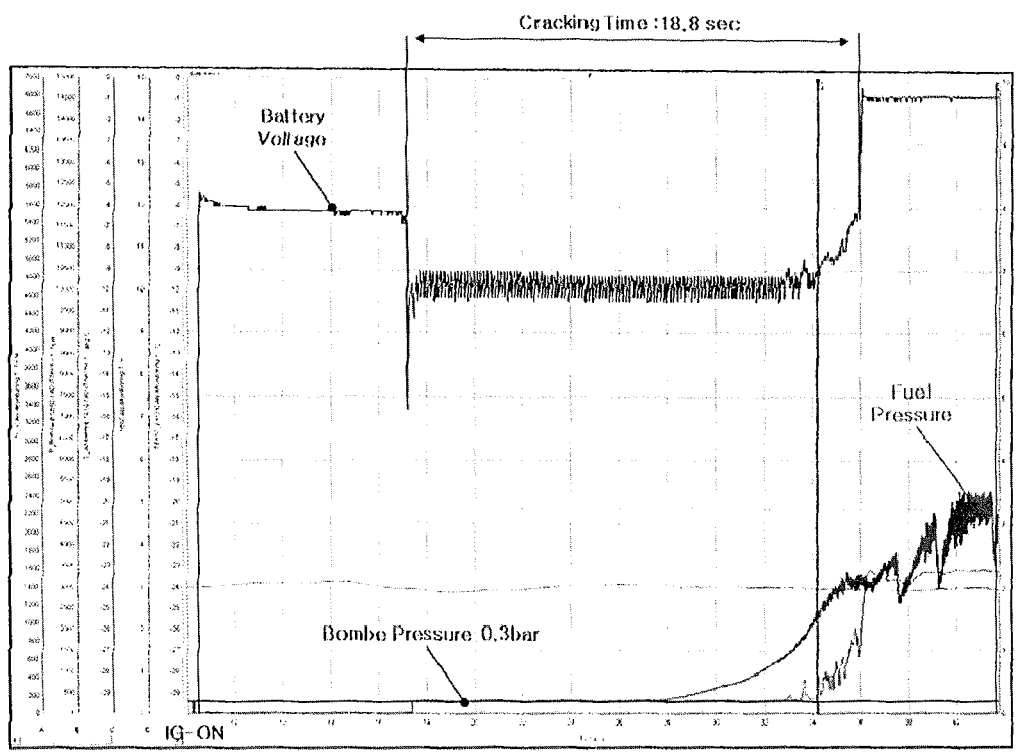
FIG. 4 is a diagram of the experiment data showing the cracking time, etc. by a pressure sustaining system for LPG bombe according to a prior art and the present invention.
Figure 4:
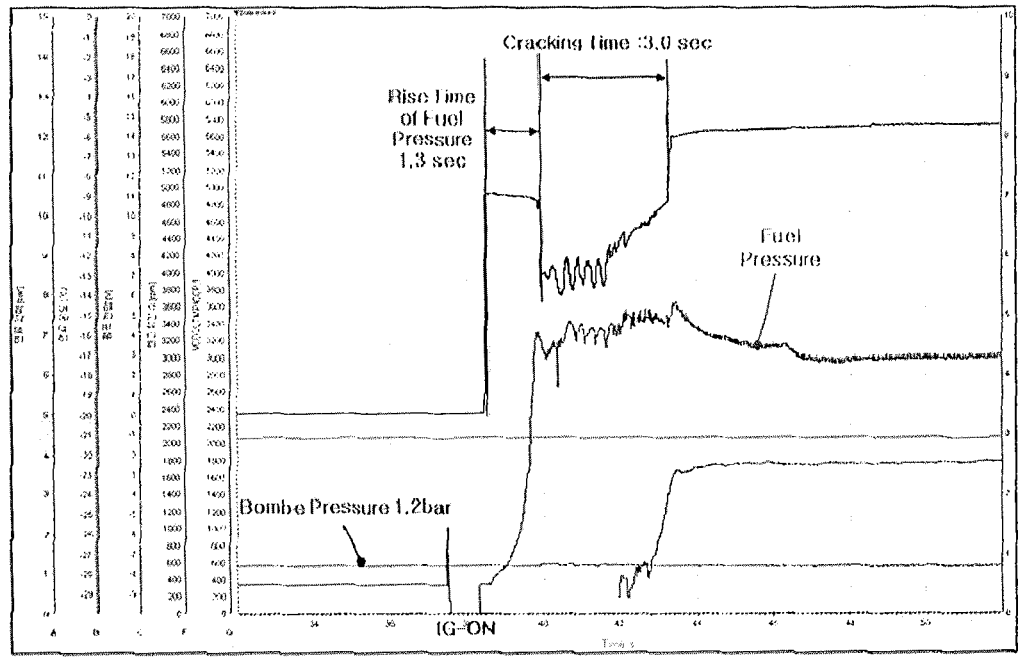

FIG. 4 is a diagram of the experiment data showing the cracking time, etc. by a pressure sustaining system for LPG bombe according to a prior art and the present invention.

FIG. 4-(a) illustrates the experiment data of the cold start ability evaluation of low temperature (−25° C.) soaking by the prior art, and FIG. 4(b) illustrates the experiment data of the cold start ability evaluation of low temperature (−25° C.) soaking by the present invention. Such experiment data are summarized in the following TABLE 2.

TABLE 2

| | Testing Fuel | Coolant Temperature | Fuel Temperature | Residual Fuel | Bombe Pressure | Rise Time of the Fuel Pressure | Start-up Time (Cracking Basis) | Decision |
|---|---|---|---|---|---|---|---|---|
| Prior Art | Butane 95% | −24.5° C. | −20.6° C. | 40% | 0.28 bar | 26.7 sec | 18.8 sec | Not Satisfactory |
| Present Invention (0.5 bar of Air Remaining) | ↑ | −24.5° C. | −21.1° C. | 40% | 1.2 bar | 1.3 sec | 3.0 sec | Good |
| | ↑ | −24.5° C. | −21.2° C. | 30% | 0.95 bar | 1.35 sec | 3.2 sec | Good |

In other words, in reference to FIG. 4 and Table 2, the rise time of the fuel pressure for the prior art was 26.7 seconds and the start-up time was 18.8 seconds, whereas, the rise time of the fuel pressure was 1.3 seconds and the start-up time was only 3 seconds if the pressure sustaining system for LPG bombe of the present invention was applied. Therefore, it is clear that the start ability of a vehicle is much improved.

Also, the air pressure inside the LPG bombe was about 0.3 bar (butane 95%) if the prior art was applied, but if 0.5 bar of the air remained in the bombe according to an exemplary embodiment of the present invention, 0.9 bar of air pressure was added by the volume compression, and the air pressure inside the bombe increased to approximately 1.2 bar.

As explained above, the present invention has the advantage of the improved start ability because it stably holds the bombe pressure even under the cold start-up conditions when the LPG evaporability is diminished by the rise of the pressure that takes place due to decrease in the air volume, by installing an one-way check valve in the front part of the air ventilation valve and by leaving a certain amount of air injected during the manufacturing process in the bombe so that the air pressure inside the bombe can be maintained above the atmospheric pressure level.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications within the spirit of the invention and scope of the Claims to be defined below.

What is claimed is:

1. A pressure sustaining system for an LPG bombe comprising;

the LPG bombe, in which an LPG fuel is injected and which is equipped with a ventilation tunnel for emitting the air inside the LPG bombe;

a check valve, selectively engaged to an opening of the ventilation tunnel, with a fixed conversion pressure so as to keep an air pressure inside the LPG bombe above a predetermined value; and an air-ventilation valve slidably engaged to the ventilation tunnel, the air ventilation valve opening or closing the ventilation tunnel, wherein the air-ventilation valve is mounted independently from the check valve within a same passage in which the check valve is located.

2. The pressure sustaining system for the LPG bombe according to claim 1, wherein the predetermined amount of conversion pressure is greater than the atmospheric pressure.

3. The pressure sustaining system for the LPG bombe according to claim 1, wherein the check valve unit includes a ball valve, a rubber valve, or a metal valve.

4. The pressure sustaining system for the LPG bombe according to claim 1, wherein the ventilation tunnel is formed as one-way.

5. A pressure sustaining system for an LPG bombe comprising:

the LPG bombe, in which an LPG fuel is injected and which is equipped with a ventilation tunnel for emitting the air inside the LPG bombe;

a check valve unit, installed at an opening of the ventilation tunnel, with a fixed conversion pressure so as to keep an air pressure inside the LPG bombe above a predetermined value, wherein the air inside the LPG bombe is not completely removed after a watertight test when the LPG bombe is manufactured, and a predetermined amount of air remains in the LPG bombe.

6. The pressure sustaining system for the LPG bombe according to claim 5, wherein the remaining air in the LPG bombe is between 10% and 20% of total volume in the LPG bombe.

7. The pressure sustaining system for the LPG bombe according to claim 5, wherein the check value unit is installed to a portion of the LPG bombe where the remaining air exists.

* * * * *